United States Patent
Miller

(10) Patent No.: US 9,455,567 B2
(45) Date of Patent: Sep. 27, 2016

(54) SURGE PROTECTOR

(71) Applicant: General Instrument Corporation, Horsham, PA (US)

(72) Inventor: David C. Miller, Whitehall, PA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 42 days.

(21) Appl. No.: 13/863,370

(22) Filed: Apr. 15, 2013

(65) Prior Publication Data

US 2013/0321964 A1     Dec. 5, 2013

Related U.S. Application Data

(60) Provisional application No. 61/654,874, filed on Jun. 2, 2012.

(51) Int. Cl.
| | |
|---|---|
| *H02H 3/22* | (2006.01) |
| *H02H 3/20* | (2006.01) |
| *H02H 9/06* | (2006.01) |
| *H04M 3/18* | (2006.01) |

(52) U.S. Cl.
CPC ............. *H02H 3/20* (2013.01); *H02H 9/06* (2013.01); *H04M 3/18* (2013.01); *Y10T 29/49117* (2015.01)

(58) Field of Classification Search
CPC .................................. H02H 3/20; H04M 3/18
See application file for complete search history.

(56) References Cited

U.S. PATENT DOCUMENTS

| | | | | |
|---|---|---|---|---|
| 1,906,602 | A * | 5/1933 | Hull | 361/120 |
| 5,151,384 | A * | 9/1992 | Williams | 438/466 |
| 7,245,468 | B2 * | 7/2007 | Griesbach et al. | 361/56 |
| 2004/0252436 | A1 * | 12/2004 | Kucharski | 361/119 |
| 2004/0264087 | A1 * | 12/2004 | Bishop | 361/91.1 |
| 2008/0096429 | A1 * | 4/2008 | Mikolajczak et al. | 439/620.08 |
| 2013/0321970 | A1 | 12/2013 | Miller | |

OTHER PUBLICATIONS

Bourns, Inc., "Selection Guide: Telecom Circuit Protection", dated Nov. 2002.
EPCOS AG, "Product Profile 2009: Surge Arresters and Switching Spark Gaps", Corporate Center Edition, Ordering No. EPC:48005-7400, Germany, Aug. 2008.
A. Blicher, Thyristor Physics. Springer-Verlag, 1976, pp. 1-2.
S.K. Bhattacharya, Fundamentals of Power Electronics. Learning Materials Centre: Indian Society for Technical Education. Vikas Publishing, 2009, pp. 7-8, 34-38.

\* cited by examiner

*Primary Examiner* — Thienvu Tran
*Assistant Examiner* — Tien Mai
(74) *Attorney, Agent, or Firm* — Stewart M. Wiener

(57) ABSTRACT

A surge protection circuit having an open circuit voltage surge protector, such as a gas discharge tube (GDT), a closed circuit current surge protector, such as a thermistor, and a thyristor. The GDT has a breakdown voltage that is at least a first defined amount higher than an anticipated highest peak voltage. The thermistor has a series resistance associated with a series resistance of electrical equipment being protected and a breakdown voltage that is at least a second defined amount higher than an impulse voltage (voltage required to excite the GDT based on the breakdown voltage) for the GDT. The thyristor has a rated peak current at least a third defined amount greater than a peak current for the thermistor.

26 Claims, 7 Drawing Sheets

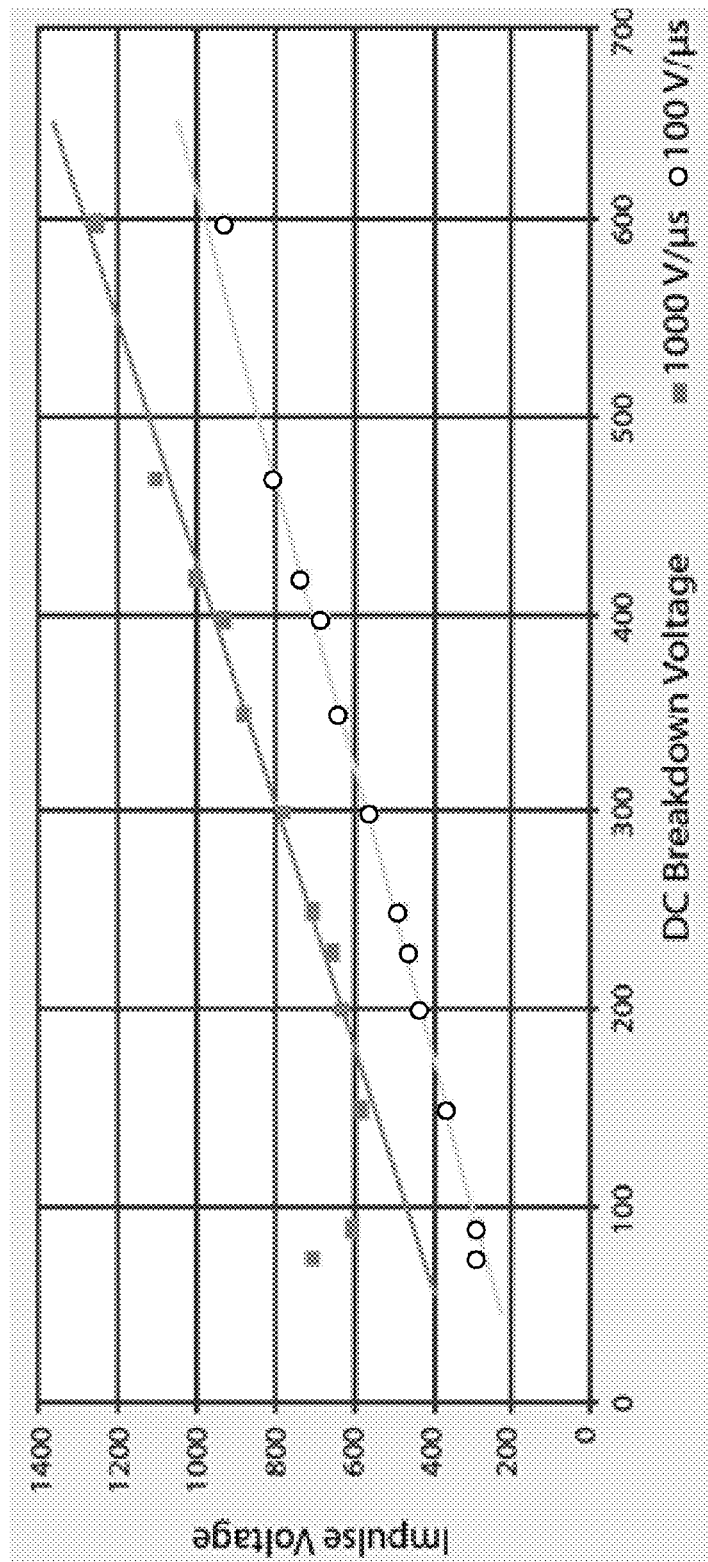
*FIG. 8* - GDT Impulse Voltage versus DC Breakdown Voltage

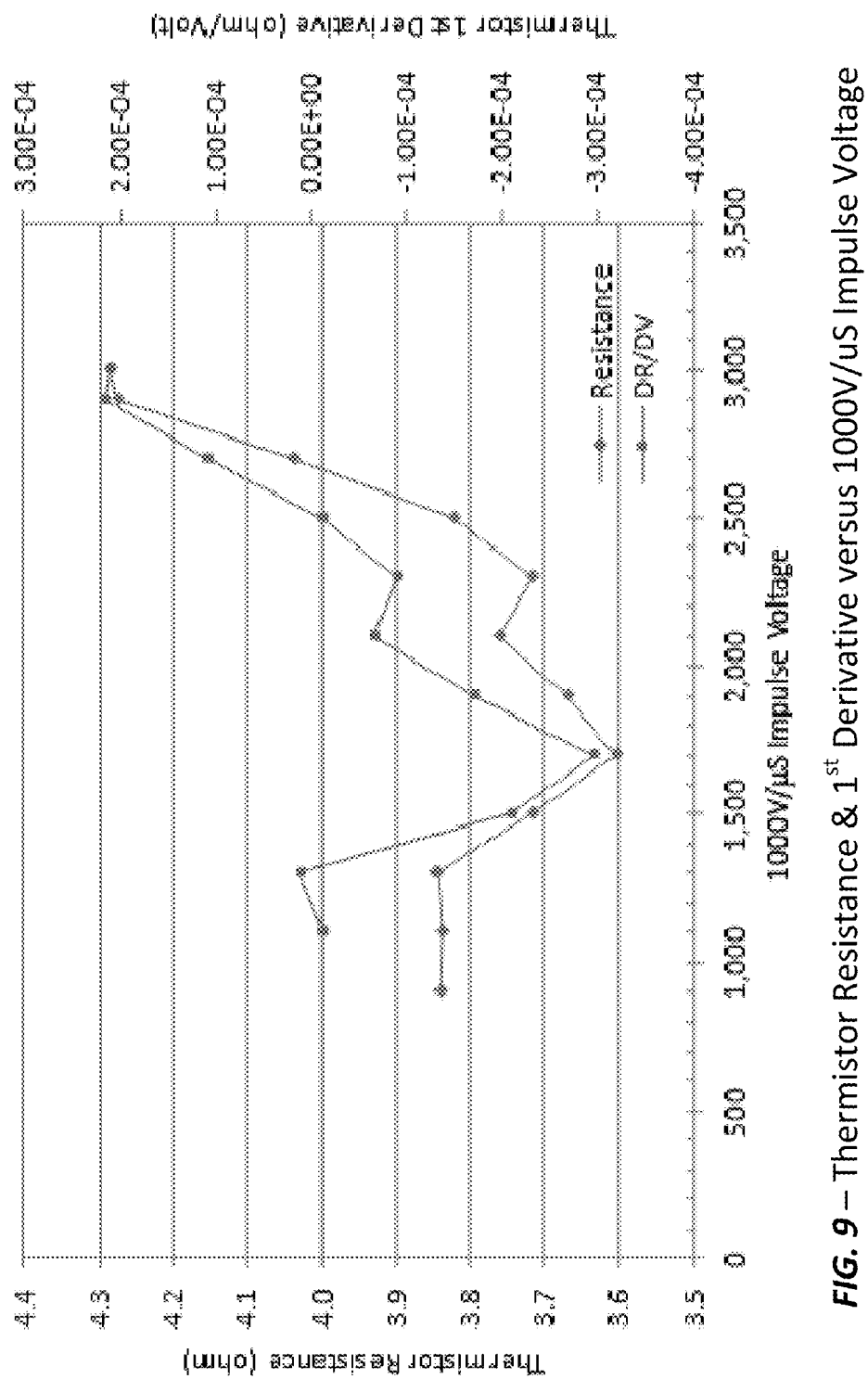
FIG. 9 – Thermistor Resistance & 1st Derivative versus 1000V/uS Impulse Voltage

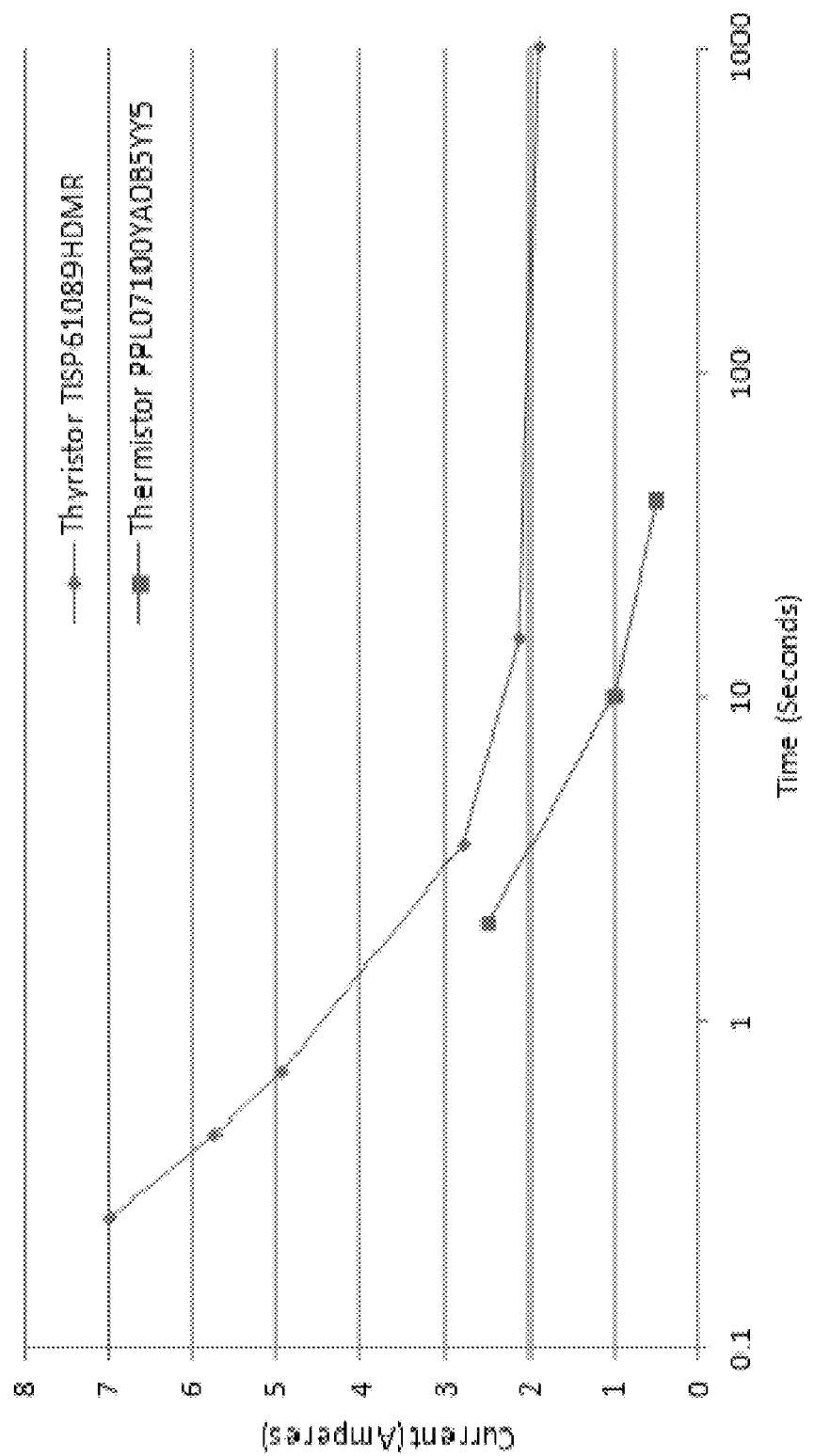
FIG. 10 - Thermistor's Time-to-Trip versus Thyristor's Time-to-Trip

SURGE PROTECTOR

PRIORITY

This application claims the priority under 35 USC §119 of U.S. Provisional Patent Application No. 61/654,874 filed on Jun. 2, 2012, which is herein incorporated by reference in its entirety.

BACKGROUND

Electrical equipment is designed to operate at certain voltage and currents. The electrical equipment may be capable of handling certain spikes in voltage and/or current. The electrical equipment may include spike protection circuitry to protect against certain types of spikes (e.g., reduce, limit, remove, and/or isolate the spikes so the spikes don't reach the electronics therewithin). Furthermore, external surge protection devices may be utilized to further protect the electrical devices.

The spike protection circuitry is limited in the type of protection it provides. Lightning storms may create surges that may cause damage to the electrical equipment. In areas where lightning storms are common this may produce a wide variety of surges/spikes.

FIG. 1 illustrates an example connection of a local area network (LAN) 100 within a subscriber location 110 to a wide area network (WAN) 120 via an interface device 130. The WAN 120 may be any of a various of networks including, but not limited to, a telephone network, a cable network, a digital subscriber line (DSL) network, or a satellite network. The interface device 130 may extract data from communication lines of the WAN 120 and route it to appropriate devices on the LAN 100 and may receive data from the devices on the LAN 100 and transmit them to the WAN 120 over the communications lines.

The interface device may be designed to account for spikes and certain well defined surges. However, it is possible that the interface device may encounter a variety of surges having unknown magnitude in voltage, current and energy. This may be especially true in areas that are susceptible to lightning storms and/or other WANs that are not equipped to handle prevent/limit these surges/spikes (e.g., are not well grounded). Without proper surge protection for the interface devices they may be damaged and/or destroyed by these surges.

BRIEF DESCRIPTION OF THE DRAWINGS

The features and advantages of the various embodiments will become apparent from the following detailed description in which:

FIG. 8 plots GDT Impulse Voltage versus DC breakdown Voltage;

FIG. 9 plots the thermistor's resistance and first derivative versus GDT impulse voltage; and FIG. 10 plots the thermistor's time-to-trip versus the thyristor's maximum current as a function of time duration.

DETAILED DESCRIPTION

Figure 1:
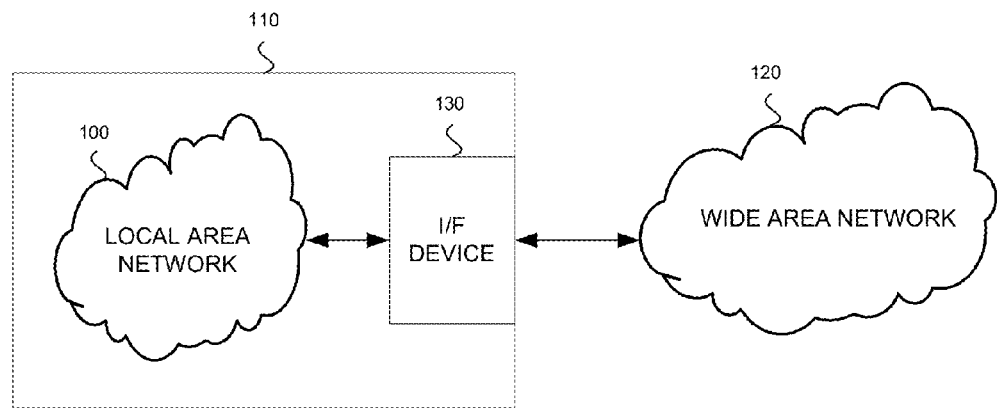
FIG. 1 illustrates an example connection of a LAN within a subscriber location to a WAN via an interface device.
Figure 2:
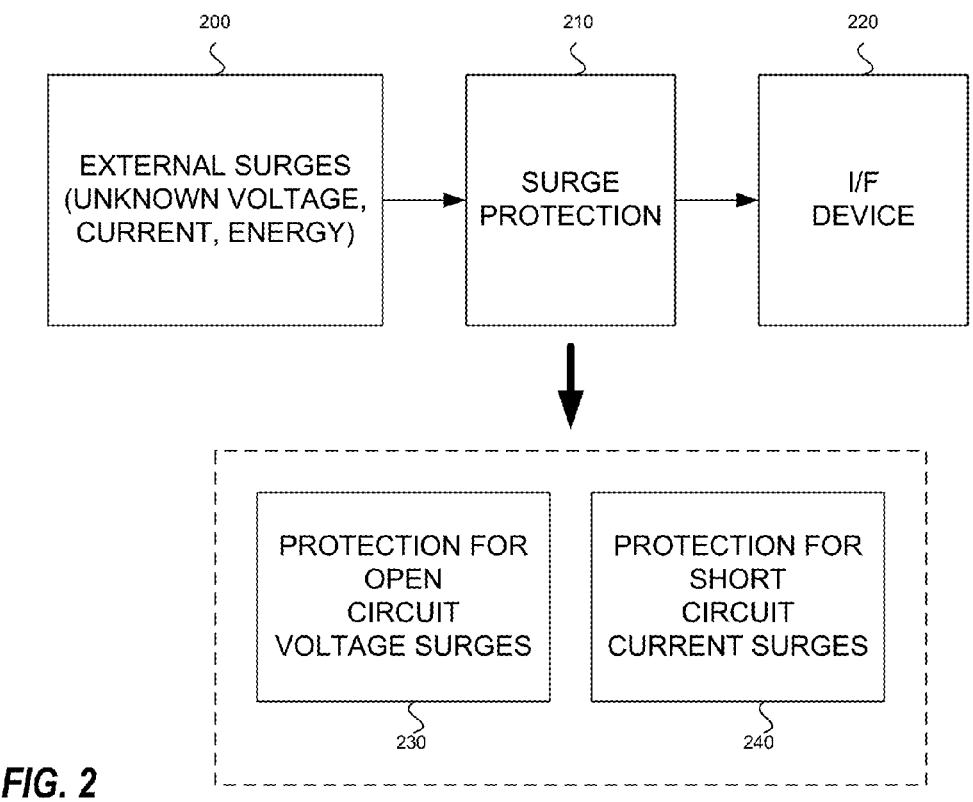
FIG. 2 illustrates a block diagram showing external surges being presented and the use of surge protection to protect the interface device therefrom, according to one embodiment.

FIG. 2 illustrates a block diagram showing external surges 200 being presented and the use of surge protection 210 to protect an interface device 220 therefrom. The external surges 200 may be of unknown magnitude in voltage, current and energy. The surge protection 210 may be designed to provide open circuit voltage surges 230 of unknown magnitude and short circuit current surges 240 of unknown magnitude.

Figure 3:
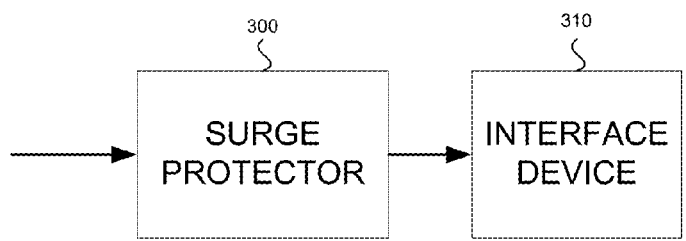
FIG. 3 illustrates a block diagram of an example surge protection circuit external to the interface device, according to one embodiment.

FIG. 3 illustrates a block diagram of an example surge protection circuit 300 external to an interface device 310.

Figure 4A:
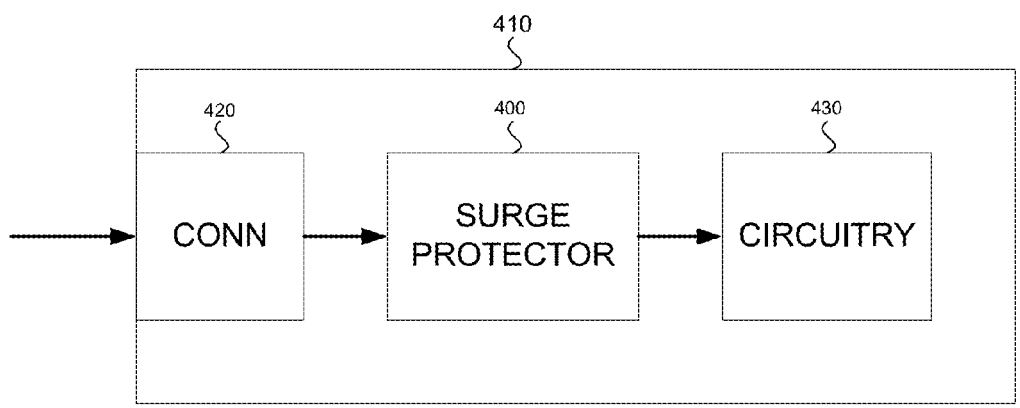
FIG. 4A-B illustrate block diagrams of example surge protection circuits internal to the interface device, according to one embodiment.
Figure 4B:
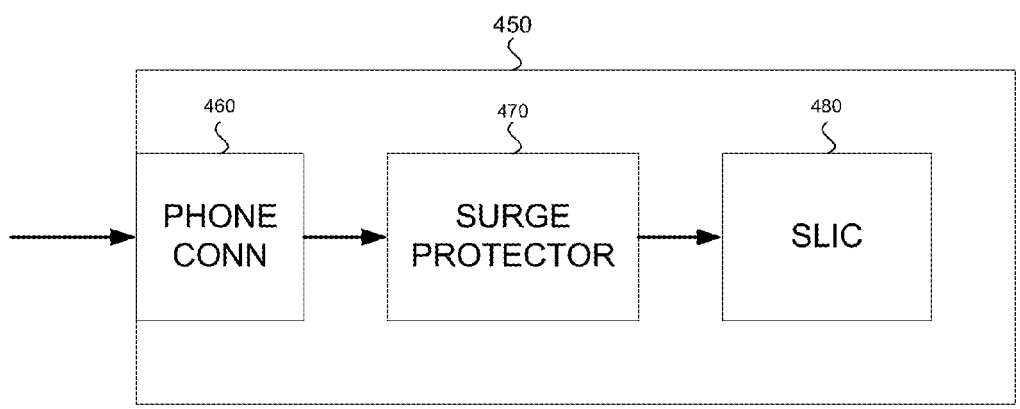

FIG. 4A illustrates a block diagram of an example surge protection circuit 400 internal to the interface device 410 (between connector 420 and internal circuitry 430). FIG. 4B illustrates a block diagram of an example interface device 450 including a phone connector 460 having surge protection 470 therewithin. The surge protection 470 is to protect a subscriber line interface card (SLIC) 480. The phone connection 460 may connect the interface device 450 to phone wire within a subscriber location. Depending on the type of interface device 450, the phone connection 460 to the internal phone lines may be on either the WAN or LAN side. For example, if the interface device 450 is utilized with a telephone network the internal phone lines are utilized to connect the interface device 450 to the phone network on WAN side. By way of another example, if the interface device 450 is utilized with a cable network the internal phone lines are utilized to connect the interface device 450 to phones on the LAN side so as to provide voice over IP service.

Figure 5:
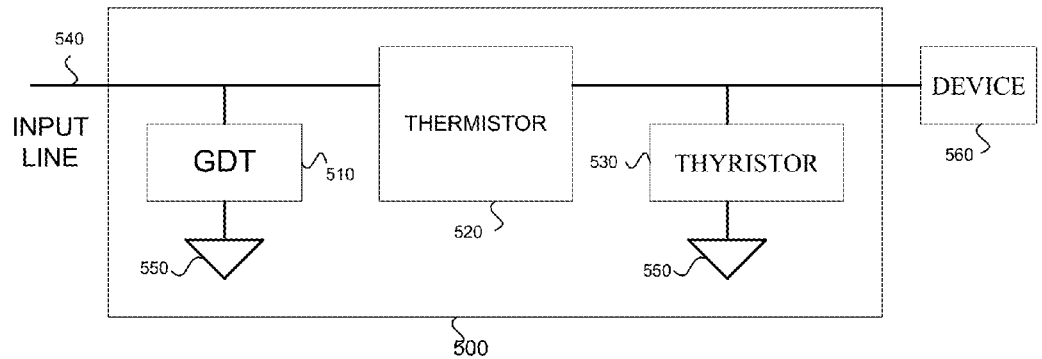
FIG. 5 illustrates an example surge protection circuit for a single wire input, according to one embodiment.

FIG. 5 illustrates an example surge protection circuit 500 according to one embodiment. The circuit 500 includes a gas discharge tube (GDT) 510, a thermistor 520 and a thyristor 530. The GDT 510 has a first side connected to an input line 540 and a second side tied to ground (the GDT shunts the input line to ground) 550. The GDT 510 is to provide surge protection against open circuit voltage surges. The GDT 510 will clamp any voltage above a certain level to that level so that the level is the maximum voltage that will be applied. In other embodiments, a different component may be utilized to provide surge protection against open circuit voltage surges. For example, a metal oxide varistor (MOV) may be substituted for a GDT.

The thermistor 520 is connected to the GDT 510 and is in series with the input line 540. The thermistor 520 is to provide surge protection against short circuit current surges. The thermistor 520 limits the current that passes therethrough as the maximum current will be based on resistance of the thermistor 520 (which may be based on resistance of interface device) at maximum voltage that it may see (from GDT). The thermistor 520 may be ceramic protective temperature coefficient (CPTC) thermistor. The thermistor 520 may be rated at approximately ten ohms to support the rating of an interface device that it is protecting (interface device can only support approximately 10 ohms of series resistance). The thermistor 520 may be an approximately 10 ohm CPTC thermistor. In further embodiments, a different component may be utilized to provide surge protection against short circuit current surges. For example, a polymer protective temperature coefficient (PPTC) thermistor, or other type of thermistor, can be substituted for a CPTC thermistor.

The thyristor 530 has a first end connected to the thermistor 520 and a second side connected to ground 550. The thyristor 530 is to clamp voltage and shunt current to provide desired voltage, current and energy to the device. The thyristor 530 is selected based on maximum voltage and current it will see and resulting output desired (based on device 560 being protected).

It should be noted that the various components illustrated as making up the surge protection circuit need not actually be contained on a single device. Rather, each of the components can be included separately, for example, within the interface device that it is providing protection for.

The example surge protection circuit of FIG. 5 is to provide surge protection for a single wire input line but is not limited thereto.

Figure 6:
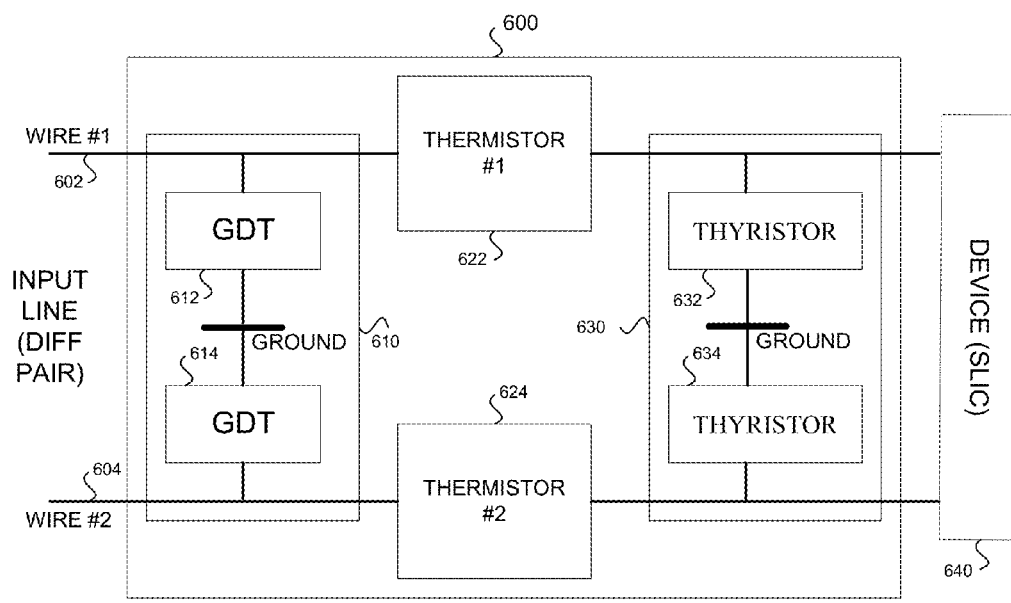
FIG. 6 illustrates an example surge protection circuit for a dual wire input, according to one embodiment.

FIG. 6 illustrates an example surge protection circuit 600 to provide surge protection to a dual wire input line (differential pair) having a first wire 602 and a second wire 604. The dual wire input may be, for example, a twisted wire pair phone line and the device being protected may be, for example, a SLIC. The surge protection circuit 600 includes a dual GDT 610, a first and second thermistor 622, 624, and a dual thyristor 630. The dual GDT 610 includes a first GDT 612 associated with the first wire 602 and a second GDT 614 associated with the second wire 604. Likewise, the dual thyristor 630 includes a first thyristor 632 associated with the first wire 602 and a second thyristor 634 associated with the second wire 604. A device 640 being protected may be, for example, a subscriber line interface card (SLIC). It should be noted that a separate GDT and/or a separate thyristor could be used for each wire.

It should be noted that while the various components making up the surge protection circuit need not actually be contained on a single device. Rather, each of the components can be included separately, for example, within the interface device that it is providing protection for.

The example surge protection circuits of FIGS. 5 and 6 include a single input line (either single wire or dual wire) but are not limited thereto. Rather the surge protection circuit could provide protection for a plurality of input lines. The input lines may include single wire input lines and/or dual wire input lines.

Figure 7:
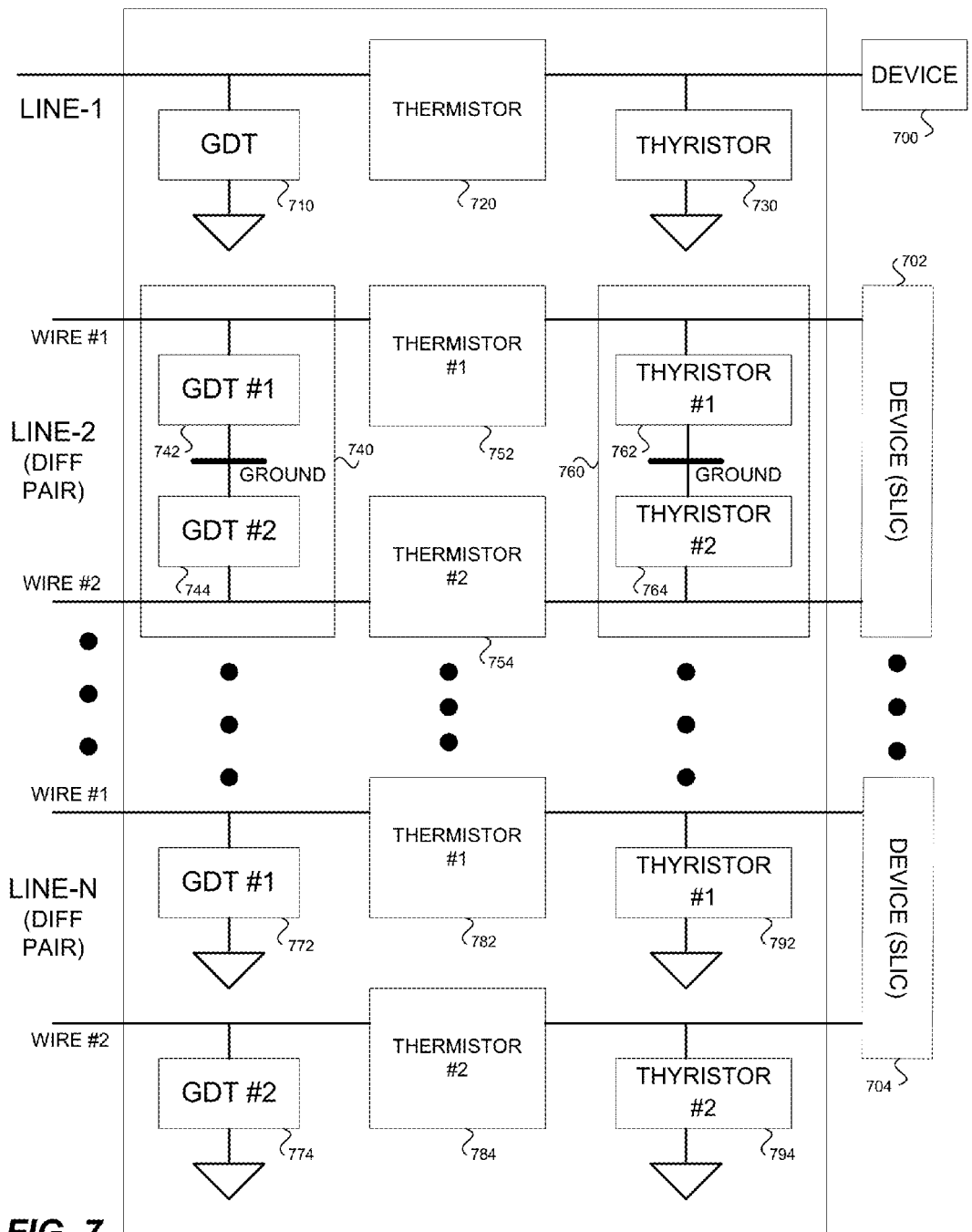
FIG. 7 illustrates an example surge protection circuit to provide surge protection to a plurality of input lines, according to one embodiment.

FIG. 7 illustrates an example surge protection circuit 700 to provide surge protection to a plurality (N) of input lines. Three input lines are illustrated in this example. A single wire input line is illustrated as Line-1, a first dual wire input line is illustrated as Line-2 and a second dual wire input line is illustrated as Line-N. The surge protection circuit 700 is in no way intended to be limited to any number or configuration of input lines.

The surge protection circuit 700 includes a GDT 710, a thermistor 720 and a thyristor 730 associated with input Line-1 to provide protection to a device 700 tied to Line-1. The surge protection circuit 700 includes a dual GDT 740 (having a first and second GDT 742, 744), a first and second thermistor 752, 754 and a dual thyristor 760 (having a first and second thyristor 762, 764), associated with input Line-2 to provide protection to a device 702 (e.g., SLIC) tied to Line-2. The surge protection circuit 700 includes a first and second GDT 772, 774, a first and second thermistor 782, 784 and a first and second thyristor 792, 794 associated with input Line-N to provide protection to a device 704 (e.g., SLIC) tied to Line-N.

The surge protection circuit 700 is not limited to the configuration illustrated. Rather, various configurations will fall within the current scope.

Surge Protection Apparatus: Step-by-Step Design Process.

As noted above, the surge protector consists of a GDT, a thermistor and a thyristor. The Surge Protector Apparatus components consist of a gas discharge tube (GDT), thermistor and thyristor. The step-by-step design process is broken into five parts. The first part of the design process identifies how to select the proper components to protect the Interface Device from a 1000V/uS impulse surge. The details of this first part are described in steps 1 through 7. The second part of the design process verifies the components selected during the first part are also suitable to protect the Interface Device from a 100V/uS impulse surge. The details of the second part are described in steps 8 through 11.

The third part of the design process verifies the components selected during the first part are also suitable to protect the Interface Device from a 1000V/uS impulse surge, even in the event 1000V/uS surge is not sufficiently high in voltage to reach the GDT's sparkover voltage. The details of the third part are described in steps 12 through 15. The fourth part of the design process verifies the components selected during the first part are also suitable to protect the Interface Device from a 100V/uS impulse surge, even in the event the 100V/uS surge is not sufficiently high in voltage to reach the GDT's sparkover voltage. The details of the fourth part are described in steps 16 through 19.

The fifth part of the design process ensures the components selected during the first part are suitable to protect the Interface Device, even in the event of an unintended power fault applied at the input. The details of the fifth part are described in step 20.

GR-1089-CORE, IEEEC62.41, IEC61000-4-5, ITU-T K21 and K44 recommendations, for example, recognized surges have impulse voltage shapes ranging from approximately 100V/uS to appropriately 1000V/uS and impulse current shapes also ranging from appropriately 100 A/uS to appropriately 1000 A/uS. Those recommendations also recognize the surge can be characterized as having an open circuit voltage as large at 8 kV and minimum source resistance ranging from 2 ohms to 10 ohms.

In the example below, the GDT clamps the 1000V/uS impulse voltage surge to approximately 1563 volts worse case. The thermistor then limits the peak current to 422 amperes worse case. Finally, the thyristor detects the impulse voltage that appears at its node, then simultaneously shunts the peak current to ground and shorts the impulse voltage to ground. The thyristor voltage short is typically less than 12 volts. Thyristor protects the muted surge (muted by the GDT and thermistor) to a region well within Interface Device's known limits of operating voltage, current and energy. Operating the thyristor within its own known limits of operating current and energy ensures the Interface Device experiences this disturbance well within its own known operating limits of voltage, current and energy. The following Design Process will demonstrate this.

First Part, 1000V/uS Impulse Sparkover Voltage:

Step 1: Determine the highest peak voltage at the input to the Surge Protection Apparatus that could be applied for at least 1 second at 5 amperes. For example, a 277 Vac, 60 Hz power line signal has a 392 voltage peak. 490 volts is 25 percent higher.

Step 2: Select a GDT that has a DC breakdown voltage at least 1.25 times higher than Step 1). The 25 percent margin ensures the highest peak voltage does not energize the GDT. For example, FIG. 8 plots GDT Impulse Sparkover Voltage versus DC breakdown Voltage. In the Figure the GDT with a 600 volt DC breakdown voltage has a DC breakdown voltage that is higher than 490 volts by 110 volts. The GDT with the 600 volt DC breakdown voltage meets 25 percent margin requirement.

Step 3: The thermistor's series resistance is given at 10.45 ohm at 10 mV-dc.

Step 4: Select a thermistor that has a breakdown voltage 1.25 times higher the GDT's 1000V/uS impulse voltage. In the manufacture of the thermistor, its breakdown voltage will vary. The 25 percent margin ensures the thermistor breakdown voltage exceeds the maximum GDT 1000V/uS impulse sparkover voltage. A margin within 25% plus or minus 5% may in some embodiments be acceptable.

The Surge Protection Apparatus will operate properly when the voltage breakdown of the thermistor exceed the worst case maximum impulse sparkover voltage of the GDT. This ensures the thermistor operates within its known operating voltage, current and energy limits when the GDT operates within its known operating voltage, current and energy limits.

For example, in FIG. 8, the GDT with the 600 volt DC breakdown voltage has a 1000V/uS impulse sparkover voltage of approximately 1250 volts. A 25 percent margin is 1563 volts. In FIG. 9, the thermistor's DC breakdown was 1700 volts. 1700 volts exceeds 1563 volts. The thermistor meets the 25 percent margin requirement.

To determine the thermistor's breakdown voltage, the thermistor's resistance as function of a 1000V/uS impulse voltage is measured. Start at a voltage several hundred volts below the GDT's rated 1000V/uS impulse voltage. Increment the test voltage in 200 volt steps. The last voltage level test should be well past the inflection point of the first derivative. To compute the first derivative, you will need to compute the change in the thermistor resistance with the change in impulse voltage. The thermistor's breakdown voltage occurs at the inflection point of the first derivative, as illustrated in FIG. 9.

Step 5: Record the thermistor's resistance at the GDT's 1000V/uS impulse sparkover voltage. From FIG. 9, the thermistor's resistance is approximately 3.7 ohms at 1563 volts.

Step 6: Compute the thermistor's peak current. That is, divide the GDT's worse case 1000V/uS impulse voltage by the thermistor's resistance at this voltage. The peak current is 422 amperes. That is, 1563 volts divided by 3.7 ohms.

Step 7: Select the thyristor that has a rated peak current at least 15% percent greater than the thermistor's worse case peak current. In this example, 11 percent of 422 amperes is 485 amperes. The 15 percent margin ensures the worst case peak current is below the thyristor's manufacturing 6 sigma standard deviation for 2/10 uS and 8/20 uS rated currents. A suitable thyristor in this example would be the Bourns part number TISP61089HDMR. The TISP61089HDMR has a 500 ampere rating for the 8/20 uS current waveform. 500 amperes exceeds 485 amperes. The thyristor meets the 15 percent margin requirement. A margin within 15% plus or minus 5% may in some embodiments be acceptable.

The thyristor is semiconductor device with known voltage, current and energy limits for an 8/20 uS surge. The thyristor's exposure to surge is less than 5 uS, since the GDT's transition time through its sparkover region, through its glow region, into its arc region is within 5 uS. Once in the arc region, the GDT shorts the surge voltage to ground. The magnitude of the GDT short is less than 15 volts.

Second Part, 100V/uS Impulse Sparkover Voltage:

Step 8: Confirm the thermistor that has a breakdown voltage 1.25 times higher the GDT's 100V/uS impulse voltage. In FIG. 9, the thermistor's DC breakdown is 1700 volts. From FIG. 8, the GDT with the 600 volt DC breakdown has a 100V/uS impulse sparkover voltage of 980 volts. A 25 percent margin is 1225 volts. 1700 volts exceeds 1225 volts. The thermistor meets the 25 percent margin requirement.

Step 9: Record the thermistor's resistance at the GDT's 100V/uS impulse sparkover voltage. From FIG. 9, the thermistor's resistance is approximately 3.85 ohms at 1225 volts.

Step 10: Compute the thermistor's peak current. That is, divide the GDT's worse case 100V/uS impulse sparkover voltage by thermistor's resistance at this voltage. The peak current is 318 amperes. That is, 1225 volts divided by 3.85 ohms.

Step 11: The TISP61089HDMR has a 500 ampere rating over the 8/20 uS current waveform. 500 amperes exceeds 318 amperes. The thyristor meets the 15 percent margin requirement.

The thyristor's exposure to the surge is less than 5 uS, since the GDT's transition time through its sparkover region, through its glow region, into its arc region is within 5 uS. Once in the arc region, the GDT shorts the surge voltage to ground. The magnitude of the short is less than 15 volts.

Third Part, 1000V/uS Surge, but No GDT Impulse Sparkover Voltage Occurs:

Step 12: Confirm the thermistor that has a breakdown voltage at least 1.25 times higher than the peak series voltage drop developed across it.

When the surge voltage is below the GDT's sparkover voltage, the surge's source impedance is assumed to be 2 ohm. This source resistance is in-series with the thermistor's resistance. The two series resistances set the peak current. The peak series current develops a voltage across the thermistor. In FIG. 9, the thermistor's DC breakdown was 1700 volts. From FIG. 8, the GDT with the 600 volt DC breakdown has a 1000V/uS impulse sparkover voltage of 1250 volts. In FIG. 9, the thermistor's resistance is approximately 3.85 ohms at 1250 volts. The peak series surge current is 214 amperes. (1225 volts divided by the sum of 2 ohm and 3.85 ohm.) The voltage developed across the thermistor is 823 volts-peak. (219 amperes times 3.85 ohms.) A 25 percent margin is 1028 volts. 1700 volts exceeds 1028 volts. The thermistor meets the 25 percent margin requirement.

Step 13: Determine the thermistor's resistance when the surge produces a voltage equal to the GDT's 1000V/uS impulse sparkover voltage. From FIG. 9, as determined in step 11), the thermistor's resistance is 3.85 ohms at 823 volts.

Step 14: Compute the thermistor's peak current. That is, divide the GDT's worse case minimum 1000V/uS impulse sparkover voltage by the surge's source resistance and the thermistor's resistance at this impulse sparkover voltage. The peak current is 214 amperes, as computed in step 12). That is, 214 amperes equals 1250 volts divided by 2.0 ohm plus 3.85 ohms.

Step 15: Confirm the thyristor's rated amperage over the 8/20 uS current waveform has at least a 15% margin to the peak thermistor current. (The thyristor reference here is the Bourns part number TISP61089HDMR.) An industry recognized surge waveform for the 1000V/uS impulse is a combination waveform of a 1.2/50 uS open circuit voltage (OCV) and a 8/20 uS short circuit current (SCI). The TISP61089HDMR's 8/20 uS current rating is 500 amperes. The thyristor's current rating exceeds the 214 amperes computed peak current. The thrysitor meets the 15 percent margin requirement.

Four Part, 100V/uS Surge, but No GDT Impulse Sparkover Voltage Occurs:

Step 16: Confirm the thermistor that has a breakdown voltage at least 1.25 times higher than the peak series voltage drop developed across it.

Where the surge voltage is below the GDT's sparkover voltage, the surge's source impedance is assumed to be 10 ohms. This source resistance is in-series with the thermistor's resistance. The two series resistances set the peak current. The peak series current develops a voltage across the thermistor. In FIG. 9, the thermistor's DC breakdown was 1700 volts. In FIG. 8, the GDT with the 600 volt DC breakdown has a 100V/uS impulse sparkover voltage of 980 volts. In FIG. 9, the thermistor's resistance is approximately 6.27 ohms at 378 volts. A 25 percent margin is 472 volts. 1700 volts exceeds 472 volts. The thermistor meets the 25 percent margin requirement. The peak series surge current is 60 amperes. (980 volts divided by the sum of 10 ohm and 6.27 ohm.)

Step 17: Determine the thermistor's resistance when the surge produces a voltage equal to the GDT's 100V/uS impulse sparkover voltage. From FIG. 9, the thermistor's resistance is approximately 6.27 ohms at 378 volts.

Step 18: Compute the thermistor's peak current. That is, divide the GDT's worse case minimum 100V/uS impulse sparkover voltage by the surge's source resistance and the thermistor's resistance at this impulse sparkover voltage. The peak current is 60 amperes, as computed in step 16). That is, 980 volts divided by 2.0 ohm plus 6.27 ohm.

Step 19: Confirm the thyristor's rated amperage over a 10/1000 uS current waveform has at least a 15% margin to the peak thermistor current. (The thyristor reference here is the Bourns part number TISP61089HDMR.) An industry recognized surge waveform for the 100V/uS impulse is a combination waveform of a 10/1000 uS open circuit voltage (OCV) and a 10/1000 uS short circuit current (SCI). The TISP61089HDMR's 10/1000 uS current rating is 100 amperes. The thyristor's current rating exceeds the 60 amperes computed peak current. The thrysitor meets the 15 percent margin requirement.

Five Part, Vac Coordination:

Step 20: In step 1) determined the highest peak voltage at the input to the Surge Protection Apparatus that could be applied for at least 1 second at 5 amperes. For example, a 277 Vac, 60 Hz power line signal has a 392 voltage peak. The GDT selected had a 600 volt DC breakdown voltage. This GDT was intentionally selected, in order that it would not energize and short the 277 Vac, 60 Hz power line signal while the power line signal was present at the input to the Surge Protector Apparatus. Instead, the 277 Vac, 60 Hz signal power fault is absorbed by the thermistor and thyristor. They protect the Interface Device in this instance.

The manufacturer of the thermistor specifies a parameter known in the industry as 'time-to-trip.' That is the amount time, for a specified current passing through the thermistor, before the thermistor resistance increases to an effective open-circuit. The manufacture of the thyristor also specifies a similar parameter. In this case, the manufacture specifies the maximum duration that the thyristor can pass this specifies current level before the thyristor is damaged.

The surge protection apparatus is designed to withstand the 277 Vac, 60 Hz power line fault. If the thermistor switches to an open-circuit in less time than the maximum rated time for the same specified current of the thyristor, then when the thermistor's resistance transitions to an open-circuit, the thermistor protects the thyristor from damage and simultaneously protects and isolates the Interface Device. FIG. 10 below plots the thermistor's time-to-trip versus the thyristor's maximum current as a function of time duration. In FIG. 10, the thermistor's resistance transitions to an effective open-circuit well before thryistor's maximum on-state time is reached for any specified current. Consequently, when the thermistor's resistance transitions to an effective open-circuit, the thermistor protects the thyristor from damage as well as simultaneously protects and isolates the Interface Device.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed is:

1. A method for selecting appropriate components for a surge protection circuit providing surge protection for a device, the method comprising:
    determining an anticipated highest peak voltage at an input to the surge protection circuit;
    selecting, based at least on the anticipated highest peak voltage and a first defined amount, an open circuit voltage surge protector having a first breakdown voltage that is at least the first defined amount higher than the anticipated highest peak voltage;
    determining an impulse voltage for the open circuit voltage surge protector, wherein the impulse voltage is voltage required to excite the open circuit voltage surge protector based on the first breakdown voltage;
    determining a second breakdown voltage for a closed circuit current surge protector, based at least on a plurality of test voltages, wherein the closed circuit current surge protector does not connect directly to a ground, and wherein the determining comprises measuring a plurality of resistance values, each associated with a respective one of the plurality of test voltages;
    selecting, based at least on the second breakdown voltage, the impulse voltage, and a second defined amount, the closed circuit current surge protector wherein the second breakdown voltage is at least the second defined amount higher than the impulse voltage;
    determining an anticipated peak current for the closed circuit current surge protector, wherein the anticipated peak current is based on an anticipated worst case impulse voltage for the open circuit voltage surge protector and associated resistance of the closed circuit current surge protector; and
    selecting, based at least on the anticipated peak current and a third defined amount, a thyristor having a rated peak current at least the third defined amount greater than the anticipated peak current;

wherein, in the surge protection circuit, the selected open circuit voltage surge protector is electrically coupled to the input and to the selected closed circuit current surge protector, and the selected thyristor is electrically coupled to the selected closed circuit current surge protector.

2. The method of claim 1, wherein the open circuit voltage surge protector is a gas discharge tube (GDT).

3. The method of claim 1, wherein the open circuit voltage surge protector is a metal oxide varistor (MOV).

4. The method of claim 1, wherein the closed circuit current surge protector is a thermistor.

5. The method of claim 1, wherein the closed circuit current surge protector is a ceramic protective temperature coefficient (CPTC) thermistor.

6. The method of claim 1, wherein the closed circuit current surge protector is a polymer protective temperature coefficient (PPTC).

7. The method of claim 1, wherein the anticipated worst case impulse voltage is the second defined amount higher than the impulse voltage.

8. The method of claim 1, wherein the first defined amount is approximately 25 percent.

9. The method of claim 1, wherein the second defined amount is approximately 25 percent.

10. The method of claim 1, wherein the third defined amount is approximately 15 percent.

11. The method of claim 1, wherein the selecting an open circuit voltage surge protector, the selecting a closed circuit current surge protector, and the selecting a thyristor are based on a surge having a 1000 V/μs impulse voltage shape.

12. The method of claim 1, wherein the selecting an open circuit voltage surge protector, the selecting a closed circuit current surge protector, and the selecting a thyristor are based on a surge having a 100 V/μs impulse voltage shape.

13. The method of claim 1, wherein the selecting an open circuit voltage surge protector, the selecting a closed circuit current surge protector, and the selecting a thyristor are based a surge having a 1000 V/μs impulse voltage shape that does not cause the open circuit voltage surge protector to be excited.

14. The method of claim 1, wherein the selecting an open circuit voltage surge protector, the selecting a closed circuit current surge protector, and the selecting a thyristor are based a surge having a 100 V/μs impulse voltage shape that does not cause the open circuit voltage surge protector to be excited.

15. A surge protection circuit for electrical equipment comprising:
an open circuit voltage surge protector configured to shunt an input line to ground, wherein the open circuit voltage surge protector has a first breakdown voltage that is at least a first defined amount higher than an anticipated highest peak voltage at an input to the surge protection circuit;
a closed circuit current surge protector configured to be connected to the open circuit voltage surge protector and in series with the input line, wherein the closed circuit current surge protector does not connect directly to a ground, and wherein the closed circuit current surge protector has a second breakdown voltage that is at least a second defined amount higher than an impulse voltage for the open circuit voltage surge protector, and wherein the impulse voltage is voltage required to excite the open circuit voltage surge protector based on the first breakdown voltage; and a thyristor configured to be connected to the closed circuit current surge protector and to shunt the input line to ground, wherein the thyristor has a rated peak current at least a third defined amount greater than an anticipated peak current for the closed circuit current surge protector, and wherein the anticipated peak current is based on an anticipated worst case impulse voltage for the open circuit voltage surge protector and associated resistance of the closed circuit current surge protector;
wherein, in the surge protection circuit, the selected open circuit voltage surge protector is electrically coupled to the input and to the selected closed circuit current surge protector, and the selected thyristor is electrically coupled to the selected closed circuit current surge protector.

16. The surge protection circuit of claim 15, wherein the open circuit voltage surge protector is a gas discharge tube (GDT).

17. The surge protection circuit of claim 15, wherein the open circuit voltage surge protector is a metal oxide varistor (MOV).

18. The surge protection circuit of claim 15, wherein the closed circuit current surge protector is a thermistor.

19. The surge protection circuit of claim 15, wherein the closed circuit current surge protector is a ceramic protective temperature coefficient (CPTC) thermistor.

20. The surge protection circuit of claim 15, wherein the closed circuit current surge protector is a polymer protective temperature coefficient (PPTC).

21. An interface device comprising:
a connector to receive an input line;
circuitry configured to receive the input line; and
a surge protection circuit configured between the input line and the circuitry to protect the circuitry from external surges may be of unknown magnitude in voltage, current and energy, wherein the surge protection circuit includes
a gas discharge tube (GDT) configured to shunt the input line to ground, wherein the GDT has a first breakdown voltage that is at least a first defined amount higher than an anticipated highest peak voltage for the interface device at an input to the surge protection circuit;
a ceramic protective temperature coefficient (CPTC) thermistor configured to be connected to the GDT and in series with the input line, wherein the closed circuit current surge protector does not connect directly to a ground wherein the CPTC thermistor has a second breakdown voltage that is at least a second defined amount higher than an impulse voltage for the GDT, and wherein the impulse voltage is voltage required to excite the GDT based on the first breakdown voltage; and
a thyristor configured to be connected to the CPTC thermistor and to shunt the input line to ground, wherein the thyristor has a rated peak current at least a third defined amount greater than an anticipated peak current for the CPTC thermistor, and wherein the anticipated peak current is based on an anticipated worst case impulse voltage for the GDT and associated resistance of the CPTC thermistor;
wherein, in the surge protection circuit, the GDT is electrically coupled to the input line and to the CPTC thermistor, and the thyristor is electrically coupled to the CPTC thermistor.

22. The interface device of claim 21, wherein the series resistance of the CPTC thermistor is approximately 10 ohms.

23. The interface device of claim 21, wherein the circuitry is a subscriber line interface card (SLIC).

24. The interface device of claim 21, wherein the input line is a dual wire input line, wherein the surge protection circuit includes a first GDT, a first CPTC thermistor, and a first thyristor associated with a first wire of the dual wire input line, and a second GDT, a second CPTC thermistor, and a second thyristor associated with a second wire of the dual wire input line.

25. The interface device of claim 21, wherein the input line is a dual wire input line, and wherein the surge protection circuit includes a dual GDT having a first GDT associated with a first wire of the dual wire input line and a second GDT associated with a second wire of the dual wire input line, a first CPTC thermistor associated with the first wire and a second CPTC thermistor associated with the second wire, and a dual thyristor having a first thyristor associated with the first wire and a second thyristor associated with the second wire.

26. The interface device of claim 21, further comprising additional connectors to receive additional input lines; and
additional surge protection circuits configured between the additional input lines and the circuitry.

* * * * *